United States Patent
Amir et al.

(10) Patent No.: US 9,026,670 B2
(45) Date of Patent: May 5, 2015

(54) SYSTEM AND METHOD FOR EFFICIENT CACHING AND DELIVERY OF ADAPTIVE BITRATE STREAMING

(75) Inventors: Ofir Amir, Binyamina (IL); Einat Mahat, Hod Hasharon (IL); Or Amizur, Rosh HaAyin (IL); Ohad Dekel, Kiryat Ono (IL)

(73) Assignee: Allot Communications Ltd., Hod-Hasharon (IL)

( * ) Notice: Subject to any disclaimer, the term of this patent is extended or adjusted under 35 U.S.C. 154(b) by 694 days.

(21) Appl. No.: 13/406,553

(22) Filed: Feb. 28, 2012

(65) Prior Publication Data

US 2013/0054728 A1 Feb. 28, 2013

Related U.S. Application Data

(60) Provisional application No. 61/525,844, filed on Aug. 22, 2011.

(51) Int. Cl.
| | |
|---|---|
| *G06F 15/16* | (2006.01) |
| *H04N 21/845* | (2011.01) |
| *H04N 21/2183* | (2011.01) |
| *H04N 21/222* | (2011.01) |
| *H04N 21/231* | (2011.01) |

(52) U.S. Cl.
CPC ....... *H04N 21/8456* (2013.01); *H04N 21/2183* (2013.01); *H04N 21/222* (2013.01); *H04N 21/23106* (2013.01); *H04N 21/8455* (2013.01)

(58) Field of Classification Search
CPC ............ H04N 21/8456; H04N 21/222; H04N 21/23106; H04N 21/8455; H04N 21/2183
USPC .......................................................... 709/231
See application file for complete search history.

(56) References Cited

U.S. PATENT DOCUMENTS

| | | | | |
|---|---|---|---|---|
| 6,389,462 | B1 * | 5/2002 | Cohen et al. ................... | 709/218 |
| 7,142,509 | B1 * | 11/2006 | Rovner et al. .................. | 370/230 |
| 8,756,341 | B1 * | 6/2014 | Richardson et al. ........... | 709/245 |
| 2004/0117455 | A1 * | 6/2004 | Kaminsky et al. ............. | 709/214 |
| 2006/0064500 | A1 * | 3/2006 | Roth et al. ...................... | 709/231 |
| 2008/0250099 | A1 * | 10/2008 | Shen et al. ...................... | 709/203 |
| 2012/0102226 | A1 * | 4/2012 | Hopmann et al. ............. | 709/241 |
| 2013/0103642 | A1 * | 4/2013 | Zhang ............................ | 707/609 |
| 2013/0166868 | A1 * | 6/2013 | Jarnikov et al. ............... | 711/162 |
| 2014/0245359 | A1 * | 8/2014 | De Foy et al. .................. | 725/62 |

* cited by examiner

*Primary Examiner* — Larry Donaghue
(74) *Attorney, Agent, or Firm* — Oren Reches

(57) ABSTRACT

A non-transitory computer readable medium, a system and a method for streaming, the method may include: intercepting, by a redirector, a request from a streaming application, to receive metadata indicative of location of multiple video file segments; sending to the streaming application metadata that points to locations of cached video file segments within a single streaming cache or multiple streaming caches and points to locations outside the streaming cache of other video file segments that are not cached; receiving, by the streaming cache, a request from the streaming application to receive a cached video file segment; sending from the streaming cache the cached video file segment.

32 Claims, 16 Drawing Sheets

VC1

- BigBuckBunny (Manifest)
- BigBuckBunny.video.35000.2000
- BigBuckBunny.video.35000.4000
- BigBuckBunny.audio.35000.2043
- BigBuckBunny.audio.35000.4040
- BigBuckBunny.video.64000.2000
- BigBuckBunny.video.64000.4000
- BigBuckBunny.audio.64000.2043
- BigBuckBunny.audio.64000.4040

FIG. 7

SYSTEM AND METHOD FOR EFFICIENT CACHING AND DELIVERY OF ADAPTIVE BITRATE STREAMING

This application claims the priority of U.S. provisional patent Ser. No. 61/525,844, filing date Aug. 22, 2011 which is incorporated herein by reference.

BACKGROUND OF THE INVENTION

Adaptive HTTP streaming becomes the dominant downloading protocol. In adaptive HTTP streaming a file is partitioned to a large number of file elements (can reach hundreds, thousands and even more file elements). In addition, a certain media stream can be represented by multiple versions that differ from each other by their bit rate, resolution, audio streams or other properties (each version is differed by a different group of properties). Thus, the same media stream can be represented by multiple files, each file may correspond to a certain version of the same media stream and may include a large number of file elements. Accordingly, the amount of metadata required to manage a file is very large.

There is a need to optimize the delivery of media using the HTTP streaming protocol.

SUMMARY

There may be provided a method for streaming that may include intercepting by a redirector a request from a streaming application to receive metadata indicative of location of multiple video file segments; sending to the streaming application metadata that points to locations of cached streaming video file segments within a single streaming cache or multiple streaming caches and points to locations outside the streaming caches of other video file segments that are not cached; receiving by the streaming cache a request from the streaming application to receive a cached streaming video file segment; sending from the streaming cache the cached streaming cached video file segment. It is noted that such operations are not currently available to regular web caches as they consider each segment as a single independent entity The method may include generating the metadata such as to exclude pointers to at least one bit rate version of the video file segments.

The method may include generating the metadata such as to exclude pointers to at least one bit rate version of the video file segments the at least one bit rate being un-popular.

The method may include generating the metadata such as to exclude pointers to at least one bit rate version of the video file segments the at least one bit rate differs from bit rate supported by a network of an communication service provider that is utilized for providing video file segments to the streaming application.

The method may include generating the metadata such as to include a trigger for repeating a request for receiving metadata.

The method may include updating the metadata based upon changes in a content of the streaming cache.

The method may include retrieving to the streaming cache video file segments that form an entire video file (but only one of the versions); generating multiple versions of the video file that comply to different video file formats; and providing to streaming applications video file segments that match video file formats supported by the streaming applications.

The method may include retrieving to the streaming cache video file segments of bit rates that are selected based upon bit rate versions of video file segments requested by streaming applications.

The method may include retrieving to the streaming cache video file segments that form an entire video file; generating multiple versions of the video file that comply to different video file formats; and providing to streaming applications video file segments that match video file formats supported by the streaming applications.

The method may include retrieving to the streaming cache video file segments of bit rates that are proximate in bit rate to bit rates of video file segments requested by streaming applications.

The method may include retrieving to the streaming cache video file segments that form an entire video file; re-segmenting the video file to provide video file segments that differ in size from the retrieved video file segments.

The method may include storing video file segments of a same video file based upon an expected popularity or actual popularity of the video file segments.

The method may include storing video file segments of different video files based upon an expected popularity or actual popularity of the video file segments.

The metadata may be arranged as a manifest file. A manifest file is known arrangement of metadata indicative of locations of video file segments.

The metadata may be arranged in a format that differs from a manifest file.

The method may include serving video file segments in a lower bit rate than the segment optimal bit rate, in order to compel the UT to request consecutive segments in a lower bit rate than is dictated by the network conditions.

A method may be provided and may include intercepting, by a streaming cache, a request from a streaming application, to receive metadata indicative of location of multiple video file segments; sending to the streaming application metadata that points to locations of cached streaming video file segments within a single streaming cache or multiple streaming caches and points to locations outside the streaming cache of other video file segments that are not cached; receiving, by the streaming cache, a request from the streaming application to receive a cached streaming video file segment; and sending from the streaming cache the cached streaming video file segment.

The method may include intercepting by the streaming cache, a response provided from an entity that differs from the streaming cache to receive metadata indicative of the location of multiple video file segments.

There may be provided a non-transitory computer readable medium that stores instructions for intercepting by a redirector a request from a streaming application to receive metadata indicative of location of multiple video file segments; sending to the streaming application metadata that points to locations of cached streaming video file segments within a single streaming cache or multiple streaming caches and points to locations outside the streaming cache of other video file segments that are not cached; receiving by the streaming cache a request from the streaming application to receive a cached streaming video file segment; sending from the streaming cache the cached streaming video file segment.

The non-transitory computer readable medium may store instructions for generating the metadata such as to exclude pointers to at least one bit rate version of the video file segments.

The non-transitory computer readable medium may store instructions for generating the metadata such as to exclude pointers to at least one bit rate version of the video file segments the at least one bit rate being un-popular.

The non-transitory computer readable medium may store instructions for generating the metadata such as to exclude pointers to at least one bit rate version of the video file segments the at least one bit rate differs from bit rate supported by a network of an communication service provider that is utilized for providing video file segments to the streaming application.

The non-transitory computer readable medium may store instructions for generating the metadata such as to include a trigger for repeating a request for receiving metadata.

The non-transitory computer readable medium may store instructions for updating the metadata based upon changes in a content of the streaming cache.

The non-transitory computer readable medium may store instructions for retrieving to the streaming cache video file segments of bit rates that are selected based upon bit rate versions of video file segments requested by streaming applications.

The non-transitory computer readable medium may store instructions for retrieving to the streaming cache video file segments that form an entire video file; generating multiple versions of the video file that comply to different video file formats; and providing to streaming applications video file segments that match video file formats supported by the streaming applications.

The non-transitory computer readable medium may store instructions for retrieving to the streaming cache video file segments of bit rates that are proximate in bit rate to bit rates of video file segments requested by streaming applications.

The non-transitory computer readable medium may store instructions for retrieving to the streaming cache video file segments that form an entire video file; re-segmenting the video file to provide video file segments that differ in size from the retrieved video file segments.

The non-transitory computer readable medium may store instructions for storing video file segments of a same video file based upon an expected popularity or actual popularity of the video file segments.

The non-transitory computer readable medium may store instructions for storing video file segments of different video files based upon an expected popularity or actual popularity of the video file segments.

According to an embodiment of the invention a system may be provided and may be arranged to execute each method illustrated in the specification and any combination of any stages of any method illustrated in the specification. The system may include a streaming cache and a redirector. The redirector may be arranged to intercept a request from a streaming application to receive metadata indicative of location of multiple video file segments and send or redirect the request to the streaming cache. It is noted that the redirector can also send a redirect response to the streaming application.

The streaming cache may be arranged to send to the streaming application metadata that points to locations of cached streaming video file segments within a single streaming cache or multiple streaming caches and points to locations outside the streaming cache of other video file segments that are not cached; receive a request from the streaming application to receive a cached streaming video file segment; and send the cached streaming video file segment to the streaming application.

The streaming cache may be arranged to generate the metadata such as to exclude pointers to at least one bit rate version of the video file segments.

The streaming cache may be arranged to generate the metadata such as to exclude pointers to at least one bit rate version of the video file segments the at least one bit rate being un-popular.

The streaming cache may be arranged to generate the metadata such as to exclude pointers to at least one bit rate version of the video file segments the at least one bit rate differs from bit rate supported by a network of an communication service provider that is utilized for providing video file segments to the streaming application.

The streaming cache may be arranged to generate the metadata such as to include a trigger for repeating a request for receiving metadata.

The streaming cache may be arranged to update the metadata based upon changes in a content of the streaming cache.

The streaming cache may be arranged to retrieve cache video file segments that form an entire video file; generate multiple versions of the video file that comply to different video file formats; and provide to streaming applications video file segments that match video file formats supported by the streaming applications.

The streaming cache may be arranged to retrieve video file segments of bit rates that are selected based upon bit rate versions of video file segments requested by streaming applications.

The streaming cache may be arranged to retrieve video file segments that form an entire video file; generate multiple versions of the video file that comply with different video file formats; and provide to streaming applications video file segments that match video file formats supported by the streaming applications.

The streaming cache may be arranged to retrieve video file segments of bit rates that are proximate in bit rate to bit rates of video file segments requested by streaming applications.

The streaming cache may be arranged to retrieve to the streaming cache video file segments that form an entire video file and re-segment the video file to provide video file segments that differ in size from the retrieved video file segments.

The streaming cache may be arranged to store video file segments of a same video file based upon an expected popularity or actual popularity of the video file segments.

The streaming cache may be arranged to store video file segments of different video files based upon an expected popularity or actual popularity of the video file segments.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 6-7 illustrate the layout of the segment within a single file for Apple HTTP Live Streaming and Microsoft Smooth-Streaming according to an embodiment of the invention;

DETAILED DESCRIPTION OF THE DRAWINGS

Figure 1:
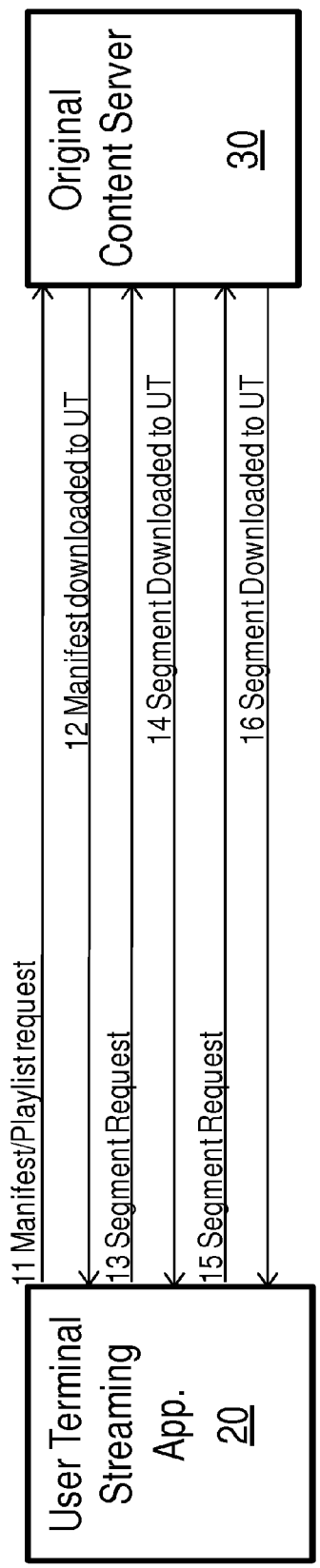
FIG. 1 illustrates an HTTP adaptive streaming scenario.

The foregoing and other objects, features, and advantages of the present invention will become more apparent from the following detailed description when taken in conjunction with the accompanying drawings. In the drawings, similar reference characters denote similar elements throughout the different views.

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

There is provided a method, system and computer readable medium for efficient caching of adaptive HTTP Streaming (Microsoft SmoothStreaming, Apple Live HTTP Streaming, etc).

The term "manifest file" also includes "playlist file" and includes metadata about file segments and especially their locations.

The terms "segments" and "video file segments" are used interchangeably in this specification.

The terms "redirector" and "request router" are used interchangeably in this specification. Redirector is any device capable of intercepting requests to metadata or video file segments destined to a first destination (such as a video source that differs from a streaming cache) and re-directing the intercepted requests to another destination (such as a streaming cache).

The term "streaming cache", indicates a device that has a cache memory and has streaming capabilities that allow it to stream video file segments. The streaming cache also includes a controller for managing the streaming cache—such as to perform pre-fetch operations, manipulate metadata and even process video files. The cache storage and HTTP streamer (illustrated in FIGS. 2-6) is a non-limiting example of a streaming cache.

The methods, systems and non-transitory computer readable medium partition a file to segments. A segment can include many file elements. The number of segments can be below ten, between ten and 100, between 100 and 1000 or even more, depending on the duration of the video. A file segment can include a single shot, multiple shots or a portion of a shot.

A streaming cache can determine to cache the most popular segments or apply any other optimization process to determine which file segments to cache.

The streaming cache can for example, determine, upon downloading video segments to cache the most demanded segments, hence with the most effective saving/storage caching ratio.

The streaming cache can create a single data file+metadata (such as an index file) with the relative location of the segments, and the segments details needed for transmission, e.g. size, duration, and bit-rate. This will significantly reduce the load on the file system since it will need to maintain two files for each movie instead of thousands. The index file can include locations of file segments of different bit rates.

FIG. 1 and table 1 illustrate a HTTP adaptive streaming between a streaming application such as a user terminal streaming application (UT 20) and video sources such as an original content server (OCS 30). The video file segment request and the segment downloading are repeated until the file is fully streamed to the UT or until the UT determines to stop the process.

TABLE 1

| UT to OCS | OCS to UT | Action |
|---|---|---|
| + | | Manifest request (11) |
| | + | Manifest download (12) |
| + | | File segment request (13) |
| | + | Segment download (14) |
| + | | File segment request (15) |
| | + | Segment download (16) |

Figure 2:
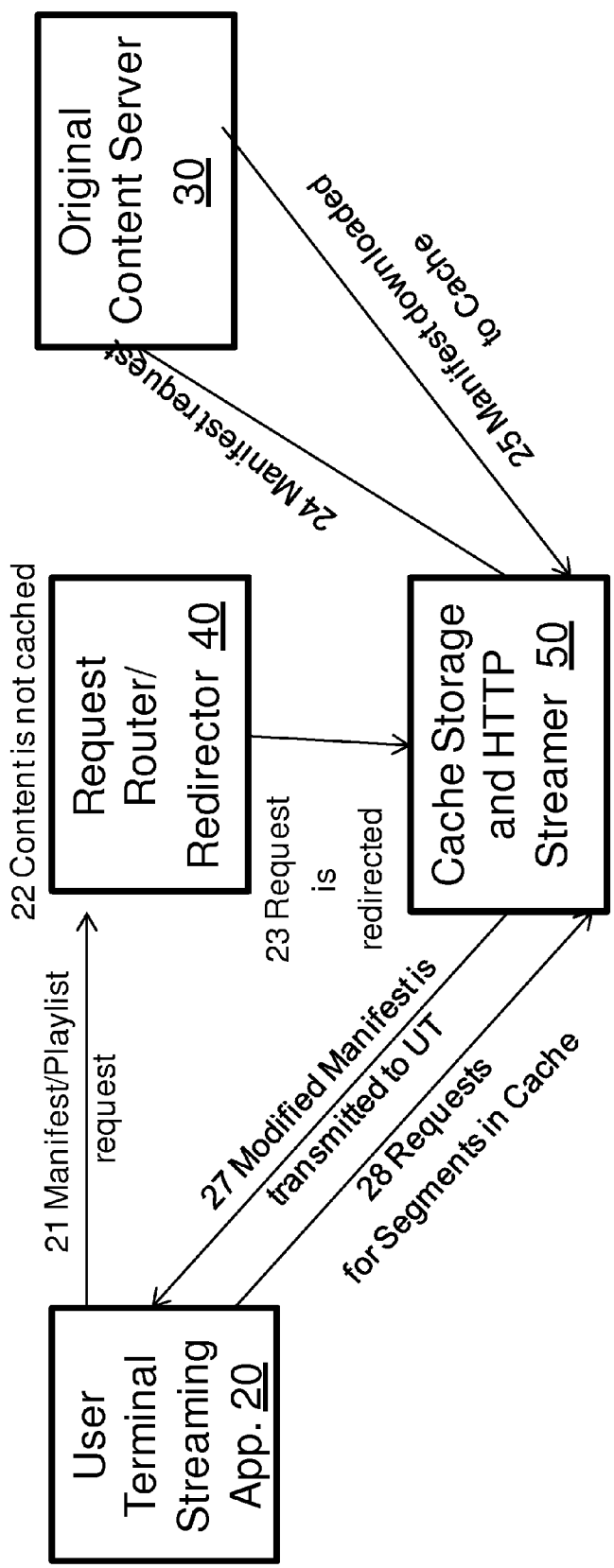
FIGS. 2-5 illustrate downloading scenarios according to various embodiments of the invention.

FIG. 2 and table 2 illustrate a caching of a HTTP adaptive streaming initial manifest request, in which a user terminal streaming application (UT) 20, a request router/redirector (redirect) 40, a streaming cache (cache) 50 and an original content server (OCS) 30 participate.

TABLE 2

| Remark | Action |
|---|---|
| UT to redirector | Manifest request. (21) |
| Redirector | Determines that the manifest is not cached (22) |
| Redirector to cache | Re-directing the manifest request (23) |
| Streaming cache to OCS | Sends the manifest request to OCS (24) |
| OCS to cache | Manifest file download to streaming cache (25) |
| Cache | Generates a new manifest file to reflect the streaming cache status. (not shown) Using URLs in the Streaming cache for segments in the cache. Using URLs in the Original Content server for segments not in cache. Optionally, the streaming cache can pre-fetch segments from the OCS before they are needed by the UT, the streaming cache can request for several segments in parallel. |
| Streaming cache to UT | Downloads the new manifest file to UT. (27) |
| UT to cache | File segment request - of a segment that resided in the streaming cache according to the new manifest file (28) |
| Streaming cache to UT | Download the requested segment (not shown) |

Figure 3:
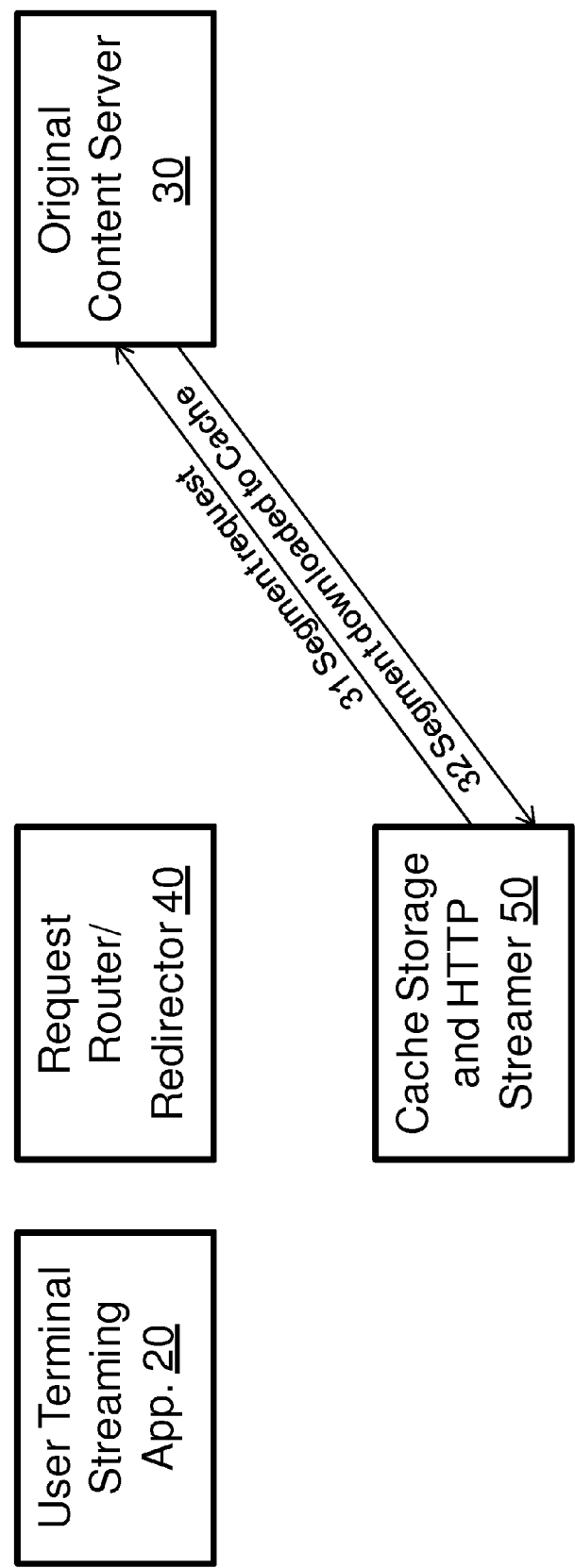

FIG. 3 illustrates a caching of file segments in an HTTP adaptive streaming environment. The streaming cache 50 requests (31) segments from the OCS 30 and the OCS 30 downloads (32) the requested segments.

The streaming cache may select which segments to download in order to achieve various goals such as achieving the most effective saving/storage caching ratio. The selected segments may be downloaded from the OCS. The selection decision can be made according to at least some of the following parameters or processes: (i) Pre-fetch of first segments; (ii) Actual Demand; (iii) Desired bit-rate, (iv) Maintaining a minimal number of segments in a buffer on top of the last requested segment.

Upon downloading the segments the streaming cache may create a single data file+index file with the relative location of the segments, when the protocol specify a single file format (e.g. Microsoft Smooth streaming) the streaming cache can regenerate the original single file using the original manifest. Generating a single file, helps the streaming cache handling the huge increase in the number of files comprising a single video content.

The file is generated in a way that enables the addition of more segments with minimal overhead.

A single cached file may be used to deliver the video stream using different delivery protocols (e.g. a video stream first received using Microsoft Smooth streaming protocol, maybe regenerated and later used for streaming using Apple HTTP Live streaming protocol, in cases where only the delivery protocol differ). This is not possible for regular web caches that view each segment as a single independent entity.

Figure 4:
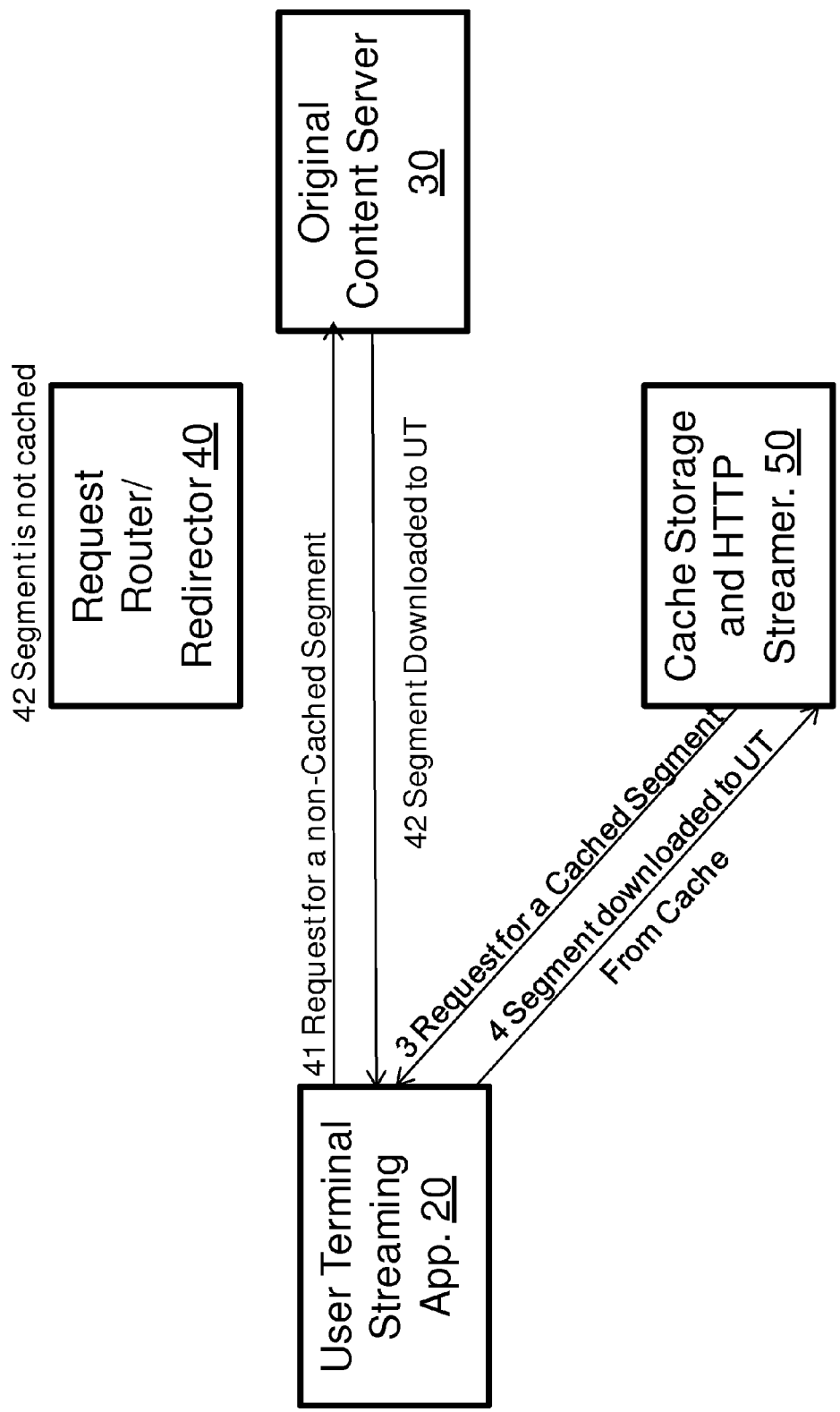

FIG. 4 illustrates streaming of file portions—file portions that are cached (according to the new manifest file) are requested 43 (by the UT 20) from the streaming cache and are downloaded (44) from the streaming cache to the UT and file portions that are not-cached (according to the new manifest file) are requested 41 (by the UT) from the OCS and are downloaded 42 from the OCS 30 to the UT 20.

According to an embodiment of the invention the streaming cache can limit the bit-rate requested by the client by transmitting a requested segment in desired bit rate (BR), and the UT will identify this rate and request the next segments in the highest available bit-rate that is below that BR.

According to an embodiment of the invention, the streaming cache can limit the bit-rate requested by the client by modifying the sliding-window manifest in order to include only the desired bit-rate segments. In order to do this the streaming cache should send the initial manifest with manifest that signal the UT to request the manifest periodically (Sliding window manifest file).

Figure 5:
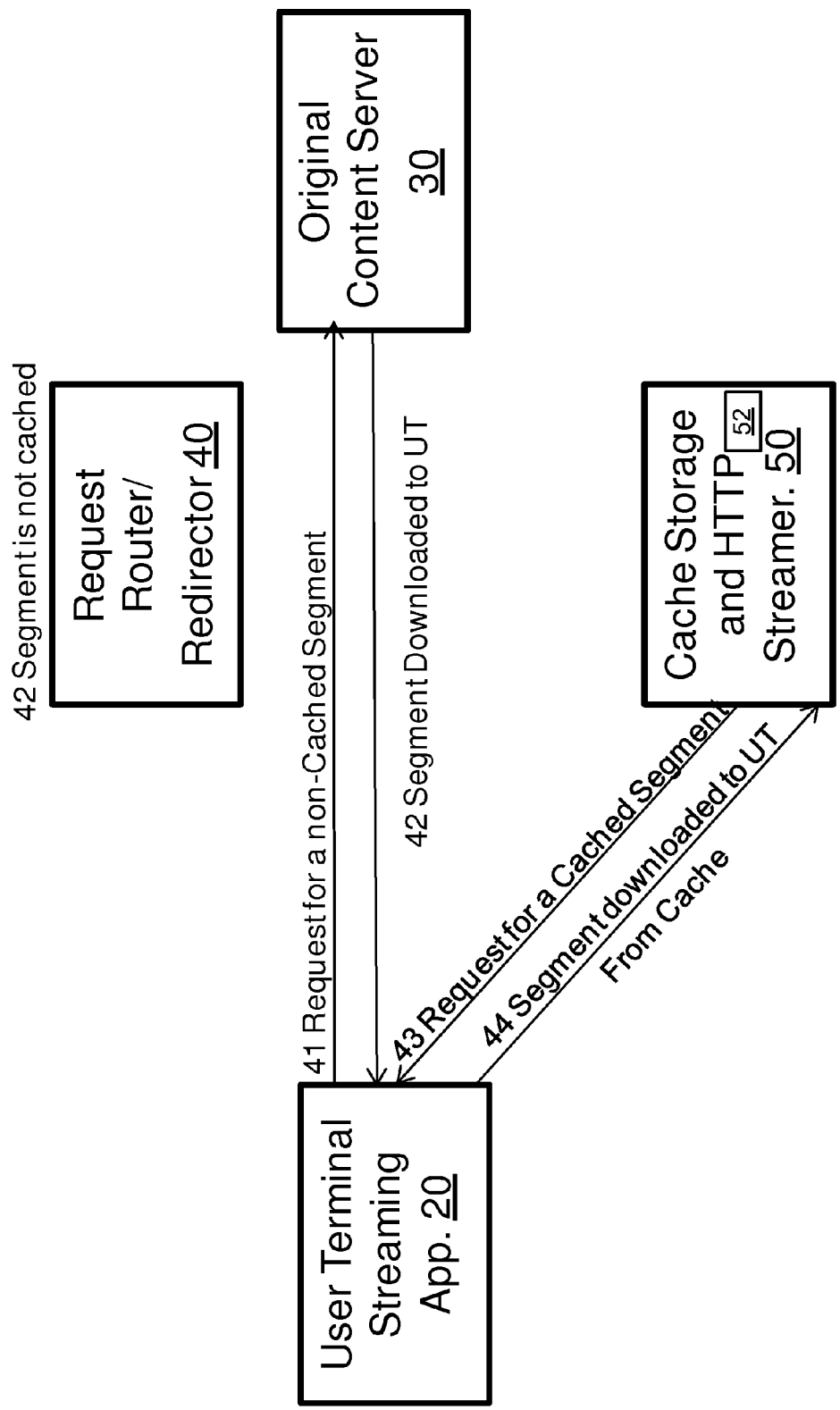
Figure 6:
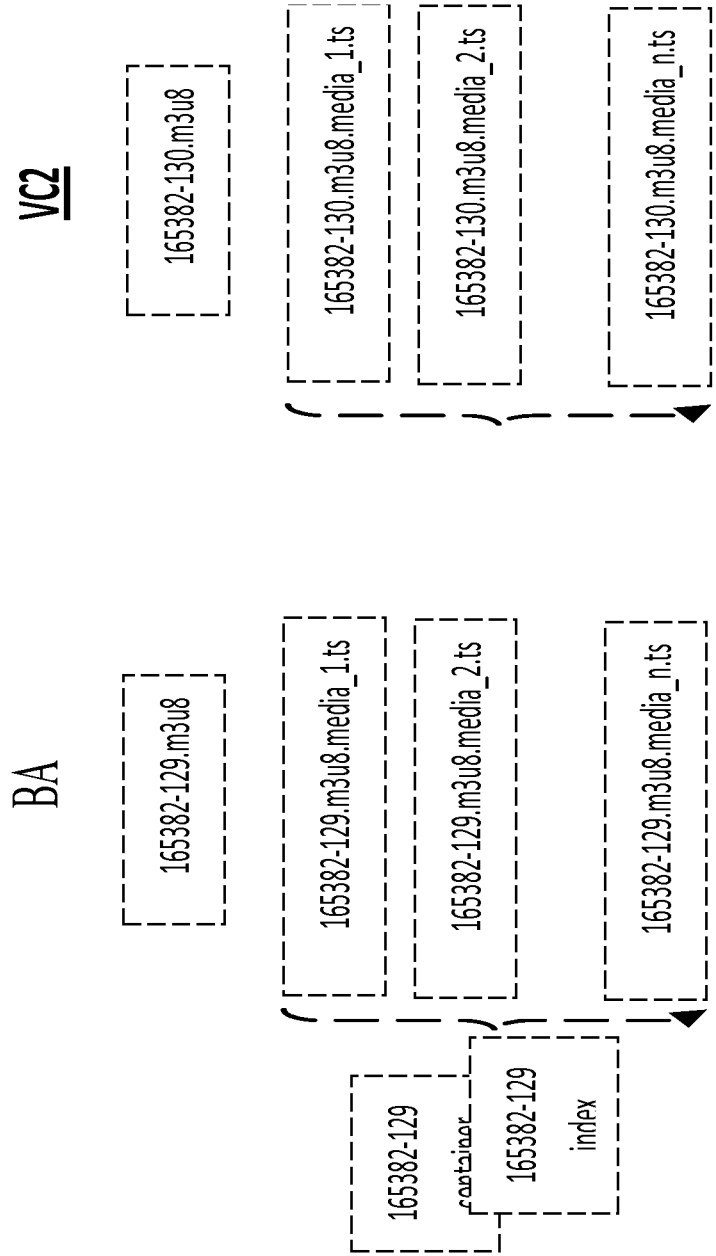
Figure 8:
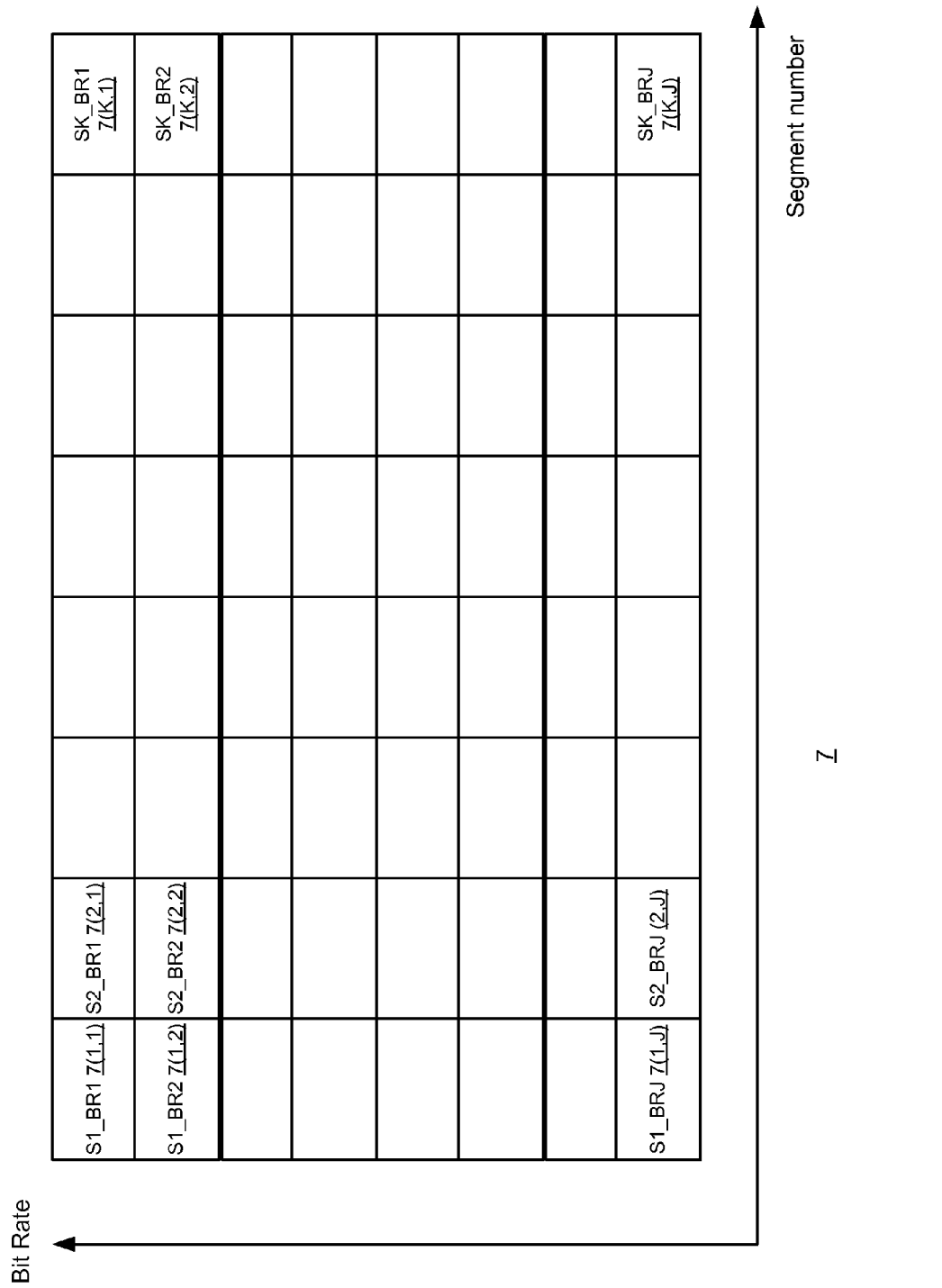
FIG. 8 illustrates multiple bit rate versions of a video file that includes multiple video file segments according to an embodiment of the invention.
Figure 9:
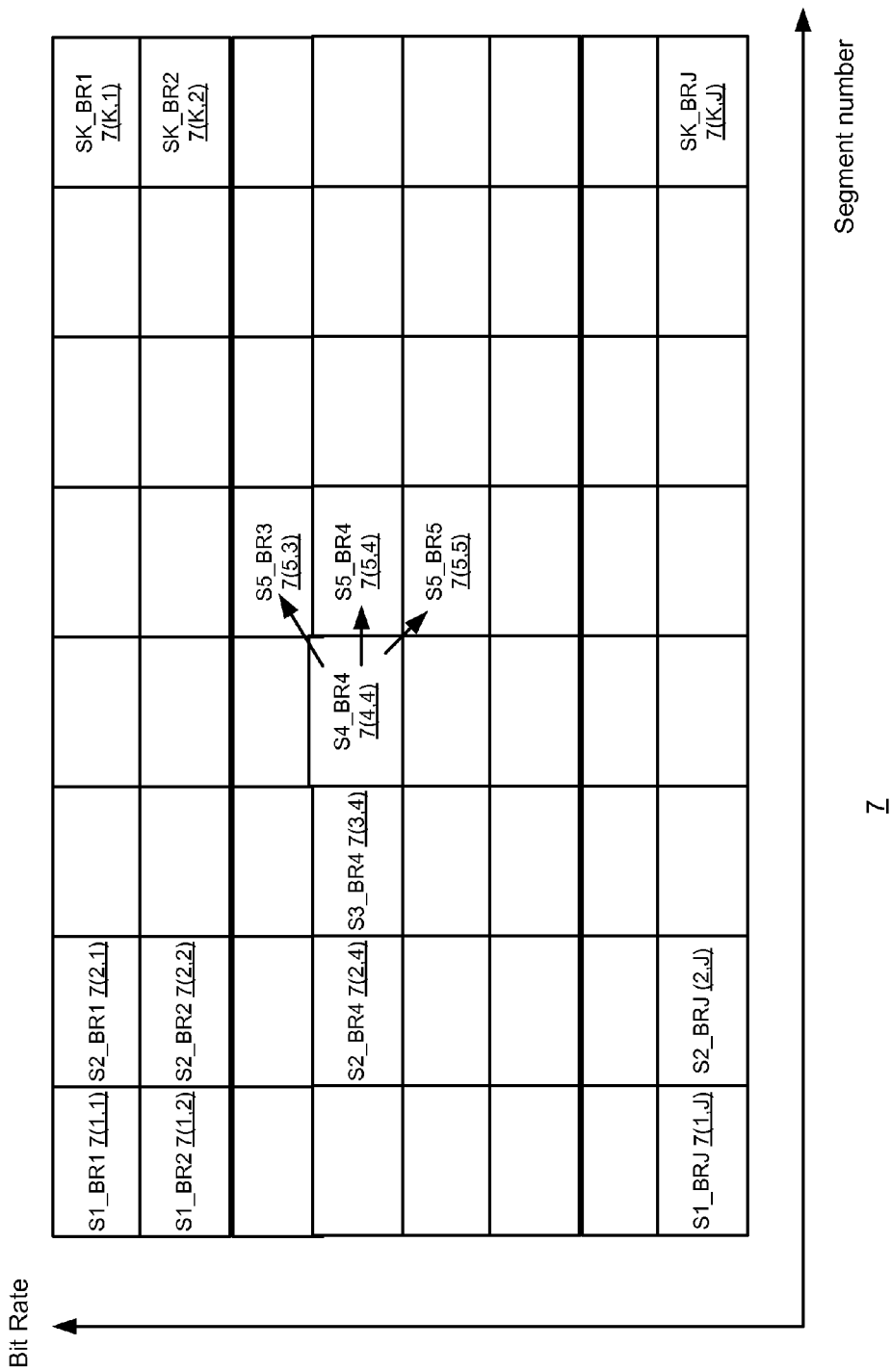
FIG. 9 illustrates multiple bit rate versions of a video file that includes multiple video file segments and bit rate version segment selection according to an embodiment of the invention.

FIG. 5 and table 5 illustrate a caching of a HTTP adaptive streaming additional (not-initial) manifest request, in which a user terminal streaming application (UT) 20, a request router/redirector (redirector) 40, streaming cache (streaming cache 50) and an original content server (OCS 20) participate.

TABLE 5

| Remark | Action |
|---|---|
| UT to redirector | As manifest sliding end nears its end (51), the UT sends a request to receive an updated manifest file (updated request). (52) |
| Redirector | Determines whether the updated manifest is cached (53). The redirectors may redirect all manifest requests to the streaming cache, and usually only redirects segments requests if they are cached |
| Redirector to cache | Re-directing the updated manifest request (54) |
| Cache | Generates a new updated manifest file to reflect the streaming cache status. (not shown)<br>Using URLs in the Streaming cache for segments in the cache.<br>Using URLs in the OCS for segments not in cache.<br>Optionally, the streaming cache can pre-fetch segments from the OCS before they are needed by the UT, the streaming cache can request for several segments in parallel. OCS can download the pre-fetched segments to the cache. |
| Streaming cache to UT | Downloads the new updated manifest file to UT. (56) |
| UT to cache | File segment request - of a segment that resided in the streaming cache according to the new manifest file (57) |
| Streaming cache to UT | Download the requested segment (not shown) |
| Streaming cache to OSC | Request to download segments (58) |
| OSC to Streaming cache | Download segments from OSC to streaming cache (59) |

According to an embodiment of the invention the streaming cache can be a part of a redirector or can be independent. The streaming cache can include a video analyzer (52) that can determine how to segment a file, which file segments to fetch and it may control the caching and downloading operations.

For streaming files, each bit rate may have a manifest file that may include locations (URLs) to all file segments. Each segment may be requested separately and may be a small file.

According to an embodiment of the invention the streaming cache (video analyzer) can further amend the manifest file—not just by directing the UT to request from the streaming cache file segments that are cached) but also by altering the manifest file to include some bit rate versions of the media stream. Thus, file segments that belong to bit rates that currently (or along longer periods) are not supported by the network (ISP) are not represented in the manifest file. Yet for another example—the streaming cache can determine that certain bit rates are not requested by users (during a pre-defined period), these bit rates can be high bit rates, low bit rates and the like. The manifest file can be updated not to include these un-popular bit rates. Yet for another example, a video analyzer (of the streaming cache, or a video source or any other entity) can be provided within information about the network limitations and can deduct the bit rates that can be supported by the network and exclude pointers to file segments that have other bit rates. Thus—by excluding these pointers from the manifest file—the UT will not ask these file segments—as he is not aware of these file segments.

According to an embodiment of the invention method can be provided and may include the following stages:
a. Redirector hijacks a request for manifest file.
b. Redirector asks the streaming cache whether or the not exist in cache.
c. If the file does not exist
i. Redirector redirects the client back to the original content server (OCS).
ii. Redirector reports the streaming cache regarding file demand—manifest or other—Manifest for MS Silverlight and all playlist requests for Apple.
iii. The streaming cache in its turn attempts to download the manifest or other metadata.
iv. The streaming cache reports to the element responsible for content allocation between the caches upon download completion
d. If the file exists
i. The modified file playlist is served.
ii. Each file segment request reaches the streaming cache directly.
iii. The streaming cache serves the file parts.
iv. The streaming cache can pre-fetch segments according to the UT watch progress (e.g. load segment n+1 while serving segment n) from the original content server (OCS), or other streaming caches holding the required content
e. Managing Segments
i. Upon downloading video segments the streaming cache selects the most demanded segments, hence with the most effective saving/storage caching ratio, and creates a single data file+index file with the relative location of the segments.
ii. This will significantly reduce the load on the file system since it will need to maintain few files for each movie instead of thousands.
iii. For segments that the streaming cache decided not to cache. The streaming cache can modify the playlist to point to the original content server (OCS) only for them.
iv. The streaming cache can redirect the specific request to another streaming cache, or to the original source.
v. The saved file on the streaming cache is formatted in such way so that the streaming cache can always download additional un-cached segments any time concatenate it to the data file and update the index file, without degrading the serving performance.

Figure 15:
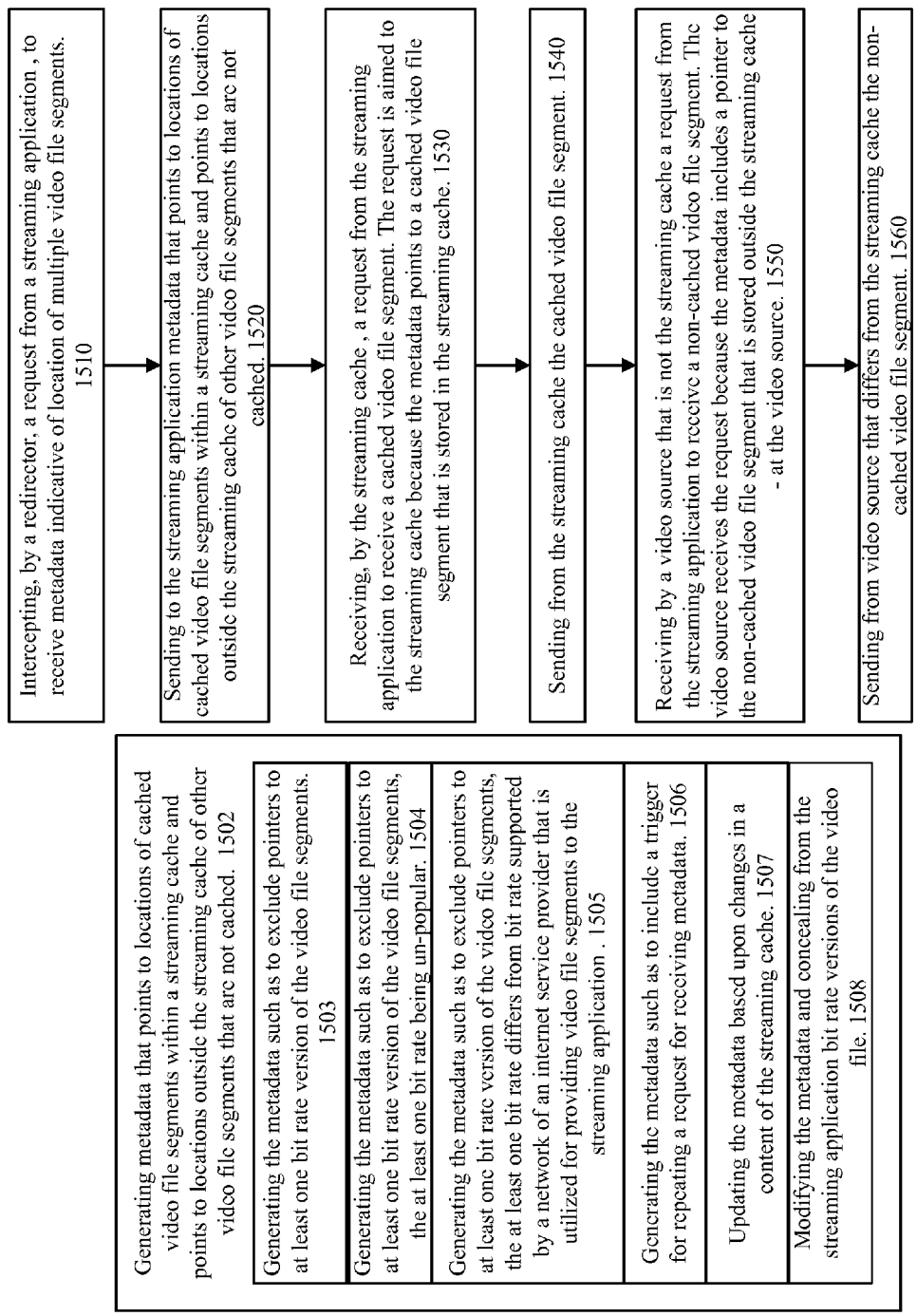
FIGS. 15 and 16 illustrate a method according to an embodiment of the invention.

FIG. 15 illustrates a method 1500 for streaming according to an embodiment of the invention.

Method 1500 may include stages 1510 and 1502.

Stage 1502 may include generating metadata that points to locations of cached video file segments within a streaming cache and points to locations outside the streaming cache of other video file segments that are not cached.

FIGS. 8-11 illustrate various bit rate versions (first till J'th) of a video file 7 that includes multiple (K) video file segments.

The (x,y)'th box of each of these figures is indicative of the x'th segment of the y'th bit rate version. See, for example S1_BR1 7(1,1), S2_BR1 7(2,1), SK_BR1 7(K,1), S1_BR2 7(1,2), S2_BR2 7(2,2), SK_BR2 7(K,2), S2_BR4 7(2,4), S3_BR4 7(3,4), S4_BR4 7(4,4), S5_BR4 7(5,4), S1_BRJ 7(1,J), S2_BRJ 7(2,J), S1_BRH 7(1,H) S2_BRH 7(2,H), and S1_BRI 7(1,I). For simplicity of explanation, only some of the video file segments were associated with reference numbers.

Figure 12:
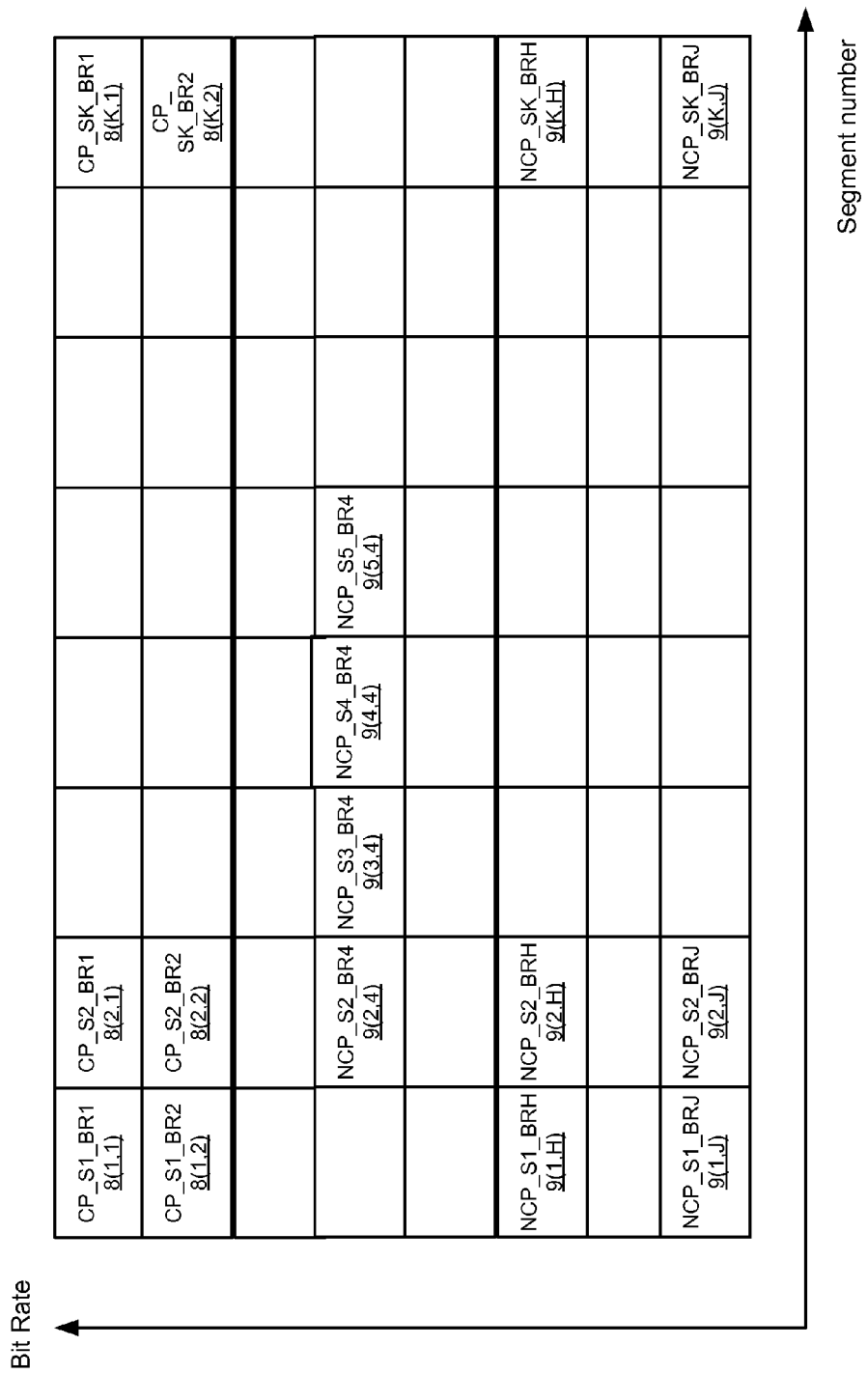
FIGS. 12-14 illustrate various examples of metadata according to various embodiments of the invention.
Figure 13:
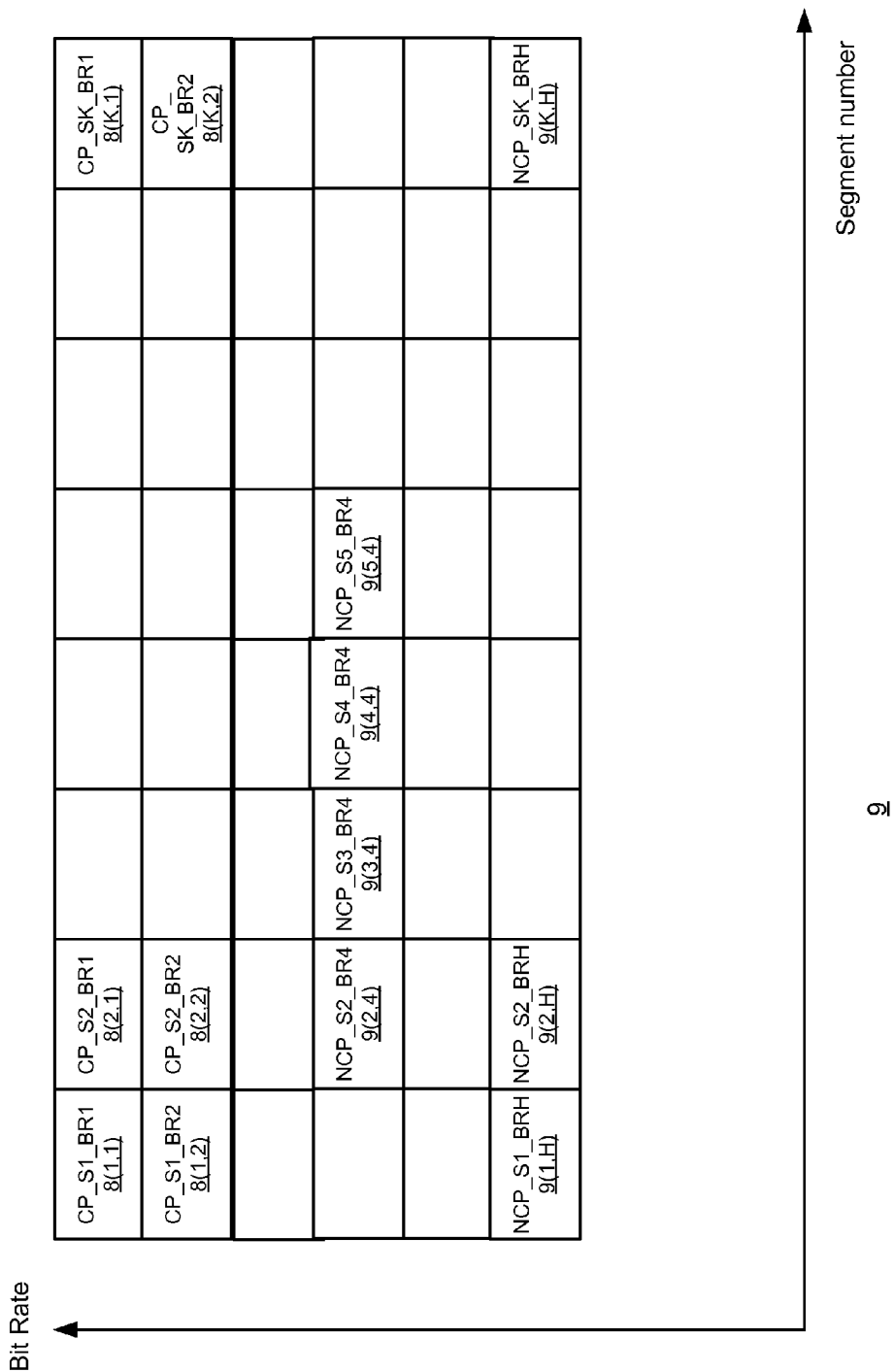
Figure 14:
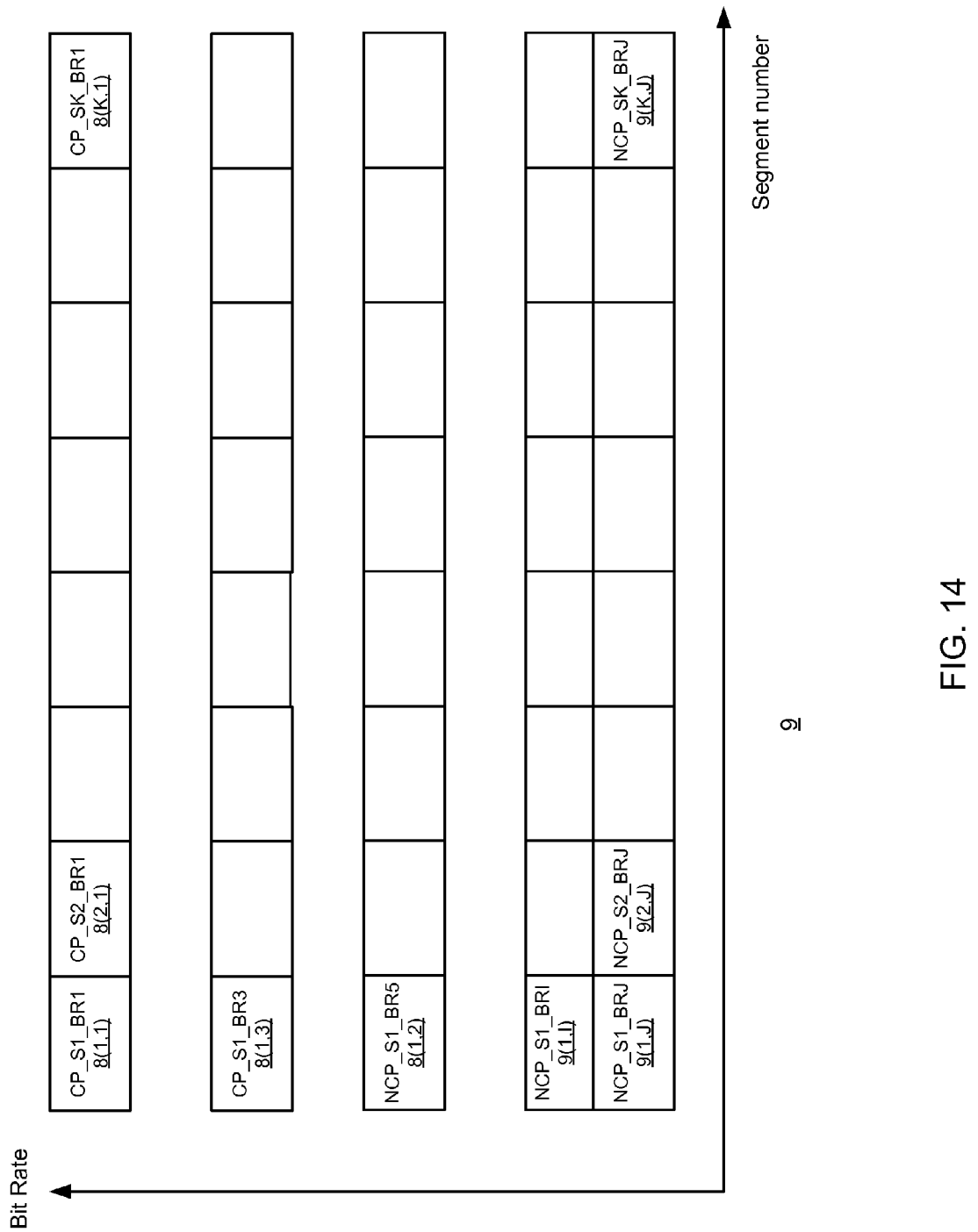

FIGS. 12-14 show examples of metadata 9 that include points to at least some of these video file segments. The metadata 9 may include pointers (denoted CP_Sx_BRy-9(x,y)) to cached video file segments (Sx_BRy) and may include pointers (denoted NCP_Sx_BRy-8(x,y)) to non-cached video file segments (Sx_BRy).

Figure 10:
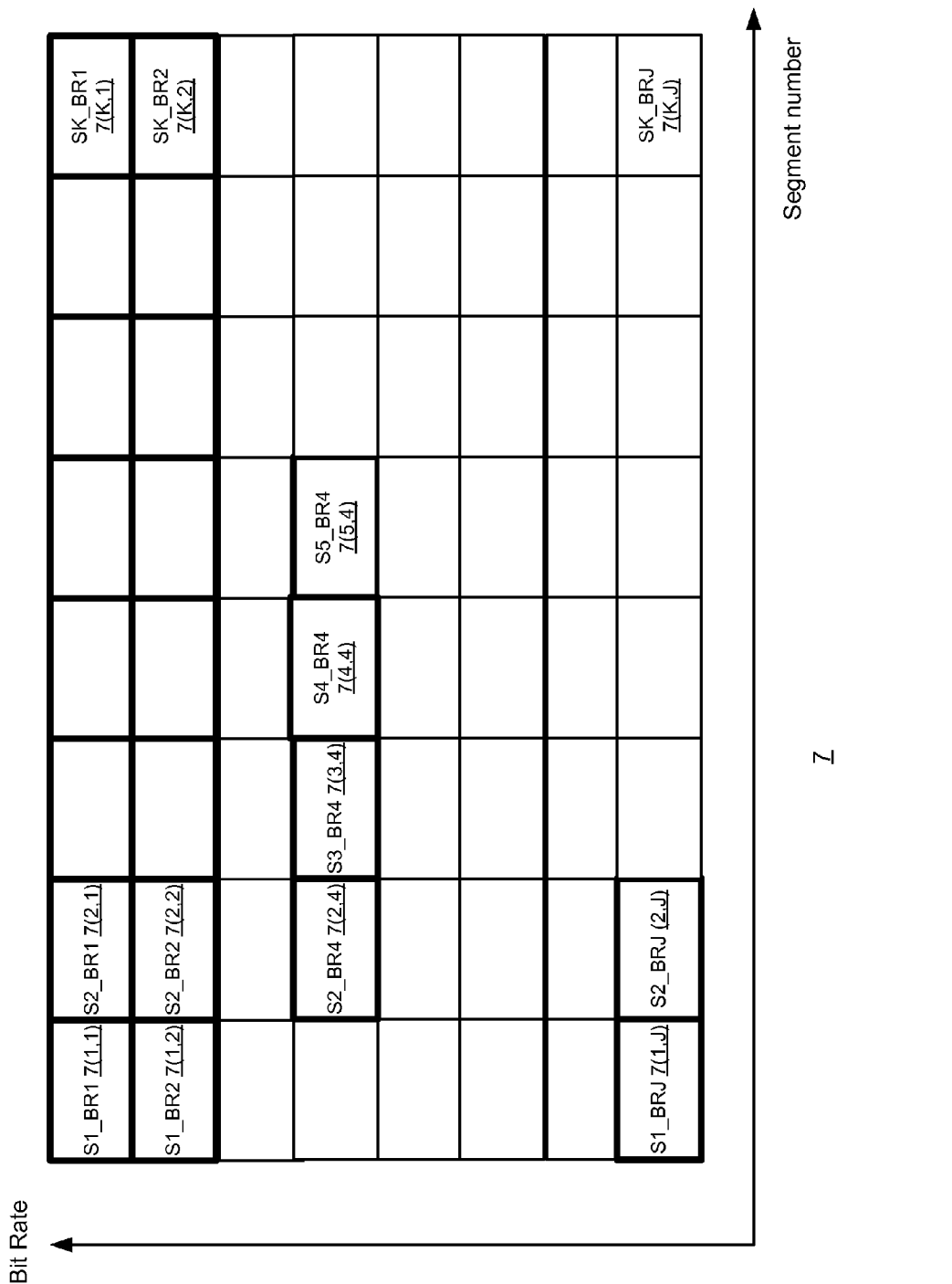
FIGS. 10 and 11 illustrate multiple bit rate versions of a video file that includes multiple video file segments and a partition between cached data file segments and non-cached video file segments according to an embodiment of the invention.
Figure 11:
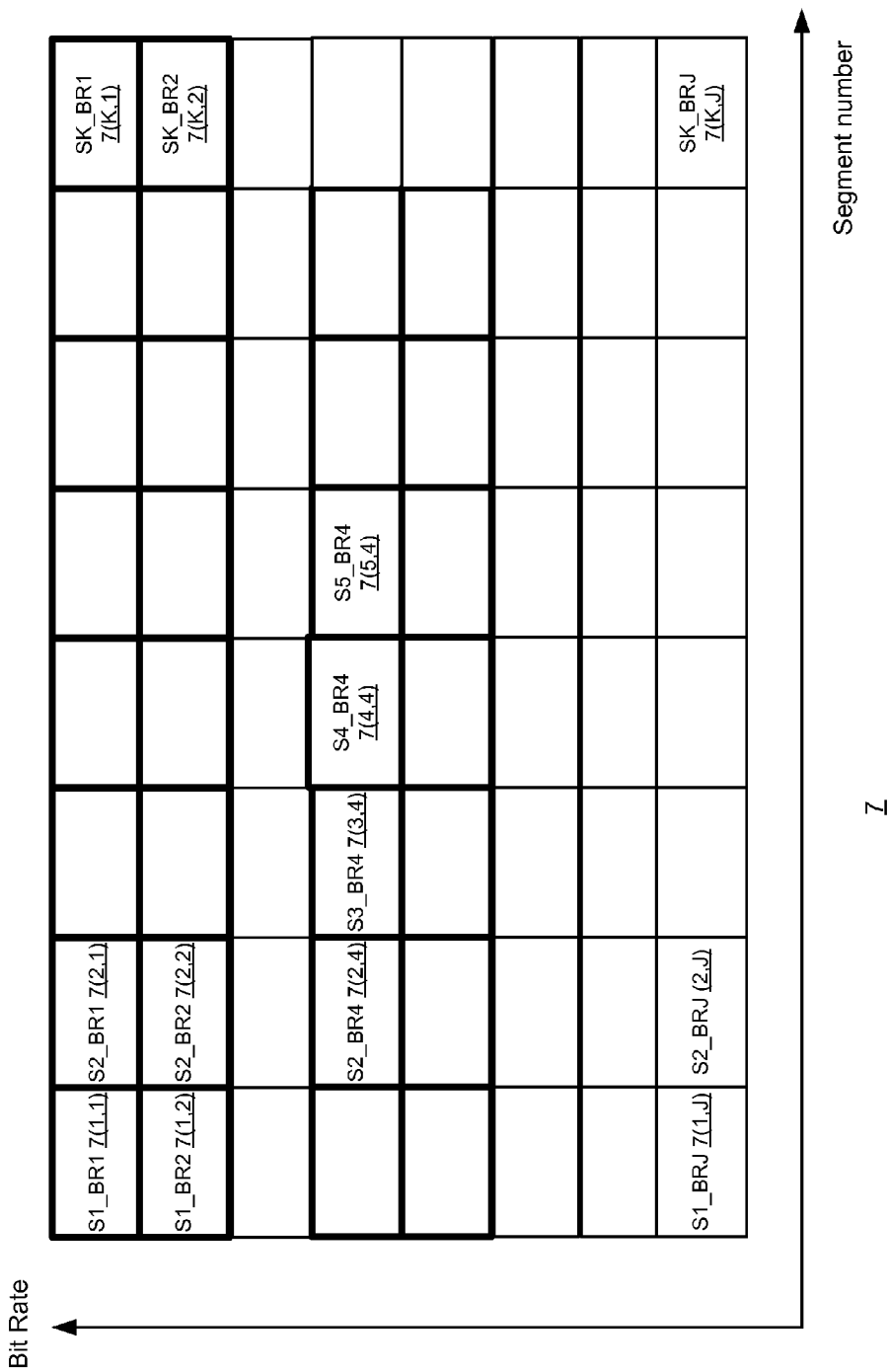

The metadata can be updated to reflect the content of the cache. It can be dynamically updated. For example, FIGS. 10 and 11 illustrate different partition between cached and non-cached video segments. The cached video segments are illustrated as having a thicker boarder.

The metadata may be formatted as a manifest file or can have other formats.

According to various embodiments of the invention, the bit rate of the data segments can be controlled by modifying (1508) the metadata and concealing from the streaming application bit rate versions of the video file.

Stage 1502 can include stages 1503, 1504, 1506, 1507 and 1508.

Stage 1503 may include generating the metadata such as to exclude pointers to at least one bit rate version of the video file segments.

Referring to FIG. 13, the metadata points to first till H'th bit rate versions of the video file, while excluding other bit rate versions that are higher than the H'th bit rate. Thus, the highest bit rate (J'th) version and any bit rate version above the H'th bit rate version are not pointed to in the metadata of FIG. 13—that a capped bit rate version metadata is provided. Yet for another example—the metadata of FIG. 14 points to the highest bit rate version, the lowest bit rate versions and to some intermediate bit rate versions but does not point to some other bit rate versions (such as the second bit rate version, the fourth bit rate version and the sixth till the H'th bit rate versions).

Stage 1504 may include generating the metadata such as to exclude pointers to at least one bit rate version of the video file segments, the at least one bit rate being un-popular. An example can be provided in FIG. 14.

Stage 1505 may include generating the metadata such as to exclude pointers to at least one bit rate version of the video file segments, the at least one bit rate differs from bit rate supported by a network of an communication service provider that is utilized for providing video file segments to the streaming application.

Examples are provided in FIGS. 13 and 14. FIG. 13 may provide a more typical Example in which some higher bit rates are not supported by the ISP.

Stage 1506 may include generating the metadata such as to include a trigger for repeating a request for receiving metadata. For example, while streaming of a video on demand video file can involve downloading a single manifest file (at the beginning of the video on demand session), the streaming of live video can require multiple iterations of a download of a manifest file that is followed by a streaming of some segments of the live video file. The trigger (stage 1506) can be in the form of labeling a video on demand video file as a live video file—which will cause the streaming application to request at different points in time a manifest file. Thus, updates of the manifest file that will occur after the beginning of the streaming of the video on demand file will be transmitted to the streaming application.

Stage 1507 may include updating the metadata based upon changes in a content of the streaming cache.

Stage 1502 can be executed in parallel to other stages of method 1500.

Stage 1510 may include intercepting, by a redirector, a request from a streaming application, to receive metadata indicative of location of multiple video file segments.

Stage 1510 may be followed by stage 1520 of sending to the streaming application metadata that points to locations of cached video file segments within a streaming cache and points to locations outside the streaming cache of other video file segments that are not cached.

Stage 1520 may be followed by stage 1530 of receiving, by the streaming cache, a request from the streaming application to receive a cached video file segment. The request is aimed to the streaming cache because the metadata points to a cached video file segment that is stored in the streaming cache.

Stage 1530 may be followed by stage 1540 of sending from the streaming cache the cached video file segment.

The method may also include stage 1550 of receiving by a video source that is not the streaming cache a request from the streaming application to receive a non-cached video file segment. The video source receives the request because the metadata includes a pointer to the non-cached video file segment that is stored outside the streaming cache—at the video source.

Stage 1550 may be followed by stage 1560 of sending from video source that differs from the streaming cache the non-cached video file segment.

Figure 16:
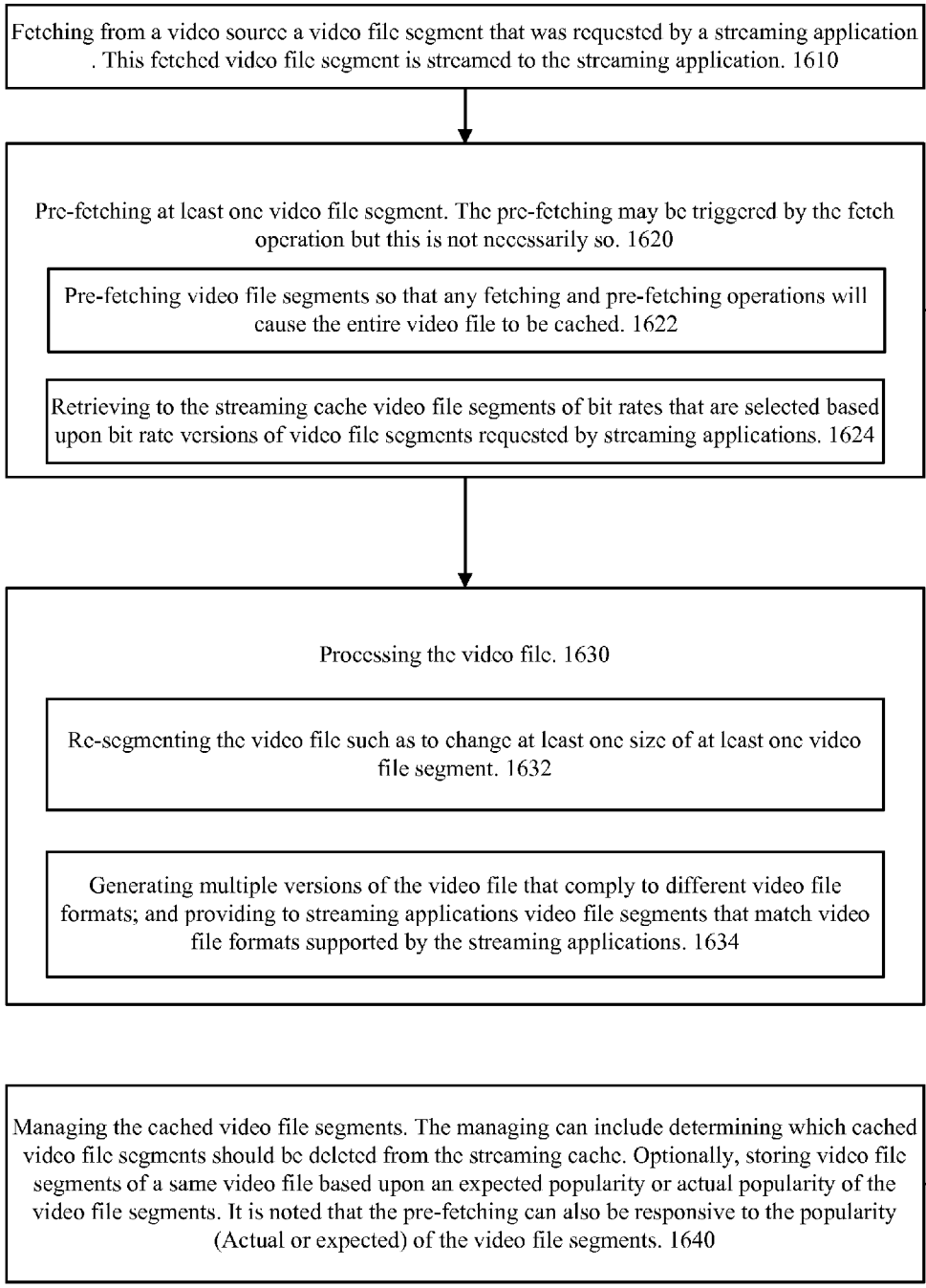

FIG. 16 illustrates a method 1600 for managing a streaming cache according to an embodiment of the invention.

Method 1600 can manage the content of the streaming cache, can perform fetch operations and pre-fetch operations and can reformat cached video files.

According to various embodiments of the invention method 1600 can include stage 1610 of fetching from a video source a video file segment that was requested by a streaming application. This fetched video file segment is streamed to the streaming application.

Stage 1600 can also include stage 1620 of pre-fetching at least one video file segment. The pre-fetching may be triggered by the fetch operation but this is not necessarily so.

For example, the pre-fetching (1620) can include stage 1622 of pre-fetching video file segments so that any fetching and pre-fetching operations will cause the entire video file to be cached.

Stage 1622 may be followed by stage 1630 of processing the video file.

Stage 1630 may include stage 1632 of re-segmenting the video file such as to change at least one size of at least one video file segment.

Stage 1630 may include stage 1634 of generating multiple versions of the video file that comply to different video file formats; and providing to streaming applications video file segments that match video file formats supported by the streaming applications. This can support a stage (that may be included in method 1500) of providing to streaming applications video file segments that match video file formats supported by the streaming applications.

Stage 1620 may include stage 1624 of retrieving to the streaming cache video file segments of bit rates that are selected based upon bit rate versions of video file segments requested by streaming applications.

Stage 1624 may include retrieving to the streaming cache video file segments of bit rates that are proximate in bit rate to bit rates of video file segments requested by streaming applications.

Stage 1620 may also be followed by stage 1640 of managing the cached video file segments. The managing can include determining which cached video file segments should be deleted from the streaming cache.

Stage 1640 may be include storing video file segments of a same video file based upon an expected popularity or actual popularity of the video file segments. It is noted that the pre-fetching can also be responsive to the popularity (Actual or expected) of the video file segments.

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

We claim:

1. A method for streaming, the method comprising:
   intercepting, by a redirector, a request from a streaming application, to receive metadata indicative of location of multiple video file segments;
   sending to the streaming application metadata that points to locations of cached streaming video file segments within a single streaming cache or multiple streaming caches and points to locations outside the streaming cache of other video file segments that are not cached;
   receiving, by the streaming cache, a request from the streaming application to receive a cached streaming video file segment;
   sending from the streaming cache the cached streaming video file segment.

2. The method according to claim 1, comprising generating the metadata such as to exclude pointers to at least one bit rate version of the video file segments.

3. The method according to claim 1, comprising generating the metadata such as to exclude pointers to at least one bit rate version of the video file segments, the at least one bit rate being un-popular.

4. The method according to claim 1, comprising generating the metadata such as to exclude pointers to at least one bit rate version of the video file segments, the at least one bit rate differs from bit rate supported by a network of an communication service provider that is utilized for providing video file segments to the streaming application.

5. The method according to claim 1, comprising generating the metadata such as to include a trigger for repeating a request for receiving metadata.

6. The method according to claim 1, comprising updating the metadata based upon changes in a content of the streaming cache.

7. The method according to claim 1, comprising retrieving to the streaming cache video file segments that form an entire video file; generating multiple versions of the video file that comply to different video file formats; and providing to streaming applications video file segments that match video file formats supported by the streaming applications.

8. The method according to claim 1, comprising retrieving to the streaming cache video file segments of bit rates that are selected based upon bit rate versions of video file segments requested by streaming applications.

9. The method according to claim 1, comprising retrieving to the streaming cache video file segments that form an entire video file; generating multiple versions of the video file that comply to different video file formats; and providing to streaming applications video file segments that match video file formats supported by the streaming applications.

10. The method according to claim 1, comprising retrieving to the streaming cache video file segments of bit rates that are proximate in bit rate to bit rates of video file segments requested by streaming applications.

11. The method according to claim 1, comprising retrieving to the streaming cache video file segments that form an entire video file; re-segmenting the video file to provide video file segments that differ in size from the retrieved video file segments.

12. The method according to claim 1, comprising storing video file segments of a same video file based upon an expected popularity or actual popularity of the video file segments.

13. The method according to claim 1, comprising storing video file segments of different video files based upon an expected popularity or actual popularity of the video file segments.

14. The method according to claim 1, wherein the metadata is arranged as a manifest file.

15. The method according to claim 1, wherein the metadata is arranged in a format that differs from a manifest file.

16. The method according to claim 1, comprising updating the metadata based upon changes in a state of the network.

17. A non-transitory computer readable medium that stores instructions for:
intercepting, by a redirector, a request from a streaming application, to receive metadata indicative of location of multiple video file segments;
sending to the streaming application metadata that points to locations of cached streaming video file segments within a single streaming cache or multiple streaming caches and points to locations outside the streaming cache of other video file segments that are not streaming cached;
receiving, by the streaming cache, a request from the streaming application to receive a cached streaming video file segment;
sending from the streaming cache the cached streaming video file segment.

18. The non-transitory computer readable medium according to claim 17, storing instructions for generating the metadata such as to exclude pointers to at least one bit rate version of the video file segments.

19. The non-transitory computer readable medium according to claim 17, storing instructions for generating the metadata such as to exclude pointers to at least one bit rate version of the video file segments, the at least one bit rate being un-popular.

20. The non-transitory computer readable medium according to claim 17, storing instructions for generating the metadata such as to exclude pointers to at least one bit rate version of the video file segments, the at least one bit rate differs from bit rate supported by a network of an communication service provider that is utilized for providing video file segments to the streaming application.

21. The non-transitory computer readable medium according to claim 17, storing instructions for generating the metadata such as to include a trigger for repeating a request for receiving metadata.

22. The non-transitory computer readable medium according to claim 17, storing instructions for updating the metadata based upon changes in a content of the streaming cache.

23. The non-transitory computer readable medium according to claim 17, storing instructions for retrieving to the streaming cache video file segments that form an entire video file; generating multiple versions of the video file that comply to different video file formats; and providing to streaming applications video file segments that match video file formats supported by the streaming applications.

24. The non-transitory computer readable medium according to claim 17, storing instructions for retrieving to the streaming cache video file segments of bit rates that are selected based upon bit rate versions of video file segments requested by streaming applications.

25. The non-transitory computer readable medium according to claim 17, storing instructions for retrieving to the streaming cache video file segments that form an entire video file; generating multiple versions of the video file that comply to different video file formats; and providing to streaming applications video file segments that match video file formats supported by the streaming applications.

26. The non-transitory computer readable medium according to claim 17, storing instructions for retrieving to the streaming cache video file segments of bit rates that are proximate in bit rate to bit rates of video file segments requested by streaming applications.

27. The non-transitory computer readable medium according to claim 17, storing instructions for retrieving to the streaming cache video file segments that form an entire video file; re-segmenting the video file to provide video file segments that differ in size from the retrieved video file segments.

28. The non-transitory computer readable medium according to claim 17, storing instructions for storing video file segments of a same video file based upon an expected popularity or actual popularity of the video file segments.

29. The non-transitory computer readable medium according to claim 17, storing instructions for storing video file segments of different video files based upon an expected popularity or actual popularity of the video file segments.

30. A system comprising a streaming cache and a redirector; wherein the redirector is arranged to: intercept a request from a streaming application, to receive metadata indicative of location of multiple video file segments, and send or redirect the request to the streaming cache; wherein the streaming cache is arranged to: send to the streaming application metadata that points to locations of cached streaming video file segments within a single streaming cache or multiple streaming caches and points to locations outside the streaming cache of other video file segments that are not streaming cached; receive a request from the streaming application to receive a cached streaming video file segment; and send the cached streaming video file segment to the streaming application.

31. A method for streaming, the method comprising:
intercepting, by a streaming cache, a request from a streaming application, to receive metadata indicative of location of multiple video file segments;
sending to the streaming application metadata that points to locations of cached streaming video file segments within a single streaming cache or multiple streaming caches and points to locations outside the streaming cache of other video file segments that are not cached;
receiving, by the streaming cache, a request from the streaming application to receive a cached streaming video file segment;
sending from the streaming cache the cached streaming video file segment.

32. The method according to claim 31, comprising intercepting by the streaming cache, a responses provided from an entity that differs from the streaming cache to receive metadata indicative of the location of multiple video file segments.

* * * * *